United States Patent
Yang (10) Patent No.: US 9,731,209 B1
(45) Date of Patent: Aug. 15, 2017

(54) WALL CLIMBING TOY

(71) Applicant: Genius Toy Taiwan Co., Ltd., Taichung (TW)

(72) Inventor: Yiming Yang, Taichung (TW)

(73) Assignee: GENIUS TOY TAIWAN CO., LTD, Taichung (TW)

( * ) Notice: Subject to any disclaimer, the term of this patent is extended or adjusted under 35 U.S.C. 154(b) by 0 days.

(21) Appl. No.: 15/182,780

(22) Filed: Jun. 15, 2016

(30) Foreign Application Priority Data

Jan. 27, 2016 (TW) ............................. 105102445 A (51) Int. Cl.
| | | |
|---|---|---|
| A63H 11/20 | (2006.01) | |
| A63H 13/00 | (2006.01) | |
| A63H 17/00 | (2006.01) | |
| A63H 11/04 | (2006.01) | |
| B62D 57/032 | (2006.01) | |
| F16B 47/00 | (2006.01) | |
| B62D 55/265 | (2006.01) | |

(52) U.S. Cl.
CPC ............ *A63H 11/04* (2013.01); *A63H 11/20* (2013.01); *A63H 13/00* (2013.01); *A63H 17/00* (2013.01); *B62D 55/265* (2013.01); *B62D 57/032* (2013.01); *F16B 47/00* (2013.01)

(58) Field of Classification Search
CPC ........ A63H 11/14; A63H 11/18; A63H 11/20; A63H 13/00; A63H 17/00; A47L 2201/00; B62D 55/265; B62D 57/032; B65G 47/91; F16B 47/00
See application file for complete search history.

(56) References Cited

U.S. PATENT DOCUMENTS

| | | | | |
|---|---|---|---|---|
| 2,936,139 A * | 5/1960 | Lindstrom | ............... | B41J 29/06 248/362 |
| 4,674,949 A * | 6/1987 | Kroczynski | ............... | B25J 5/00 114/222 |
| 5,065,973 A * | 11/1991 | Wang | ..................... | A47G 23/03 248/205.8 |
| 5,176,346 A * | 1/1993 | Liu | ........................ | F16B 47/00 248/205.8 |
| 5,551,525 A * | 9/1996 | Pack | .................... | B62D 57/032 180/8.1 |
| 5,839,532 A * | 11/1998 | Yoshiji | ................... | B62D 57/00 114/222 |
| 5,890,553 A * | 4/1999 | Bar-Cohen | ............ | B62D 57/02 180/8.1 |
| 6,793,026 B1 * | 9/2004 | De Fazio | ............... | A63H 11/04 180/8.3 |

(Continued)

*Primary Examiner* — John Ricci
(74) *Attorney, Agent, or Firm* — Burris Law, PLLC (57) ABSTRACT

A wall climbing toy includes a frame body, a drive shaft, a plurality of spring-loaded release valves, a cam shaft, a drive unit, a left gear train, a shaft extension, a plurality of primary crank arms, a plurality of connecting rods, a plurality of suction cups, and a plurality of air tube units. When each of the spring-loaded release valves is displaced from a seal position to an open position, an air seal formed between a corresponding one of the suction cups and a flat surface is broken. When the drive shaft is driven concurrently with the cam shaft to rotate, the air seals formed between the suction cups and the flat surface are broken alternately so as to permit the connecting rods to be alternately pulled away from a flat surface.

15 Claims, 10 Drawing Sheets

(56) References Cited

U.S. PATENT DOCUMENTS

| | | | |
|---|---|---|---|
| 6,942,190 B1 * | 9/2005 | Lu | F16B 47/00 248/205.5 |
| 8,371,898 B1 * | 2/2013 | Sinisi | A63H 11/04 180/164 |
| 2002/0119726 A1 * | 8/2002 | Wilk | A63H 11/20 446/92 |
| 2007/0161323 A1 * | 7/2007 | Fischer | A63H 11/04 446/330 |
| 2014/0361136 A1 * | 12/2014 | Smith | F16B 47/006 248/363 |

* cited by examiner

WALL CLIMBING TOY

CROSS-REFERENCE TO RELATED APPLICATION

This application claims priority from Taiwanese patent application no. 105102445, filed on Jan. 27, 2016.

FIELD

The disclosure relates to a wall climbing toy, more particularly to a wall climbing toy with a plurality of suction cups.

BACKGROUND

Figure 1:
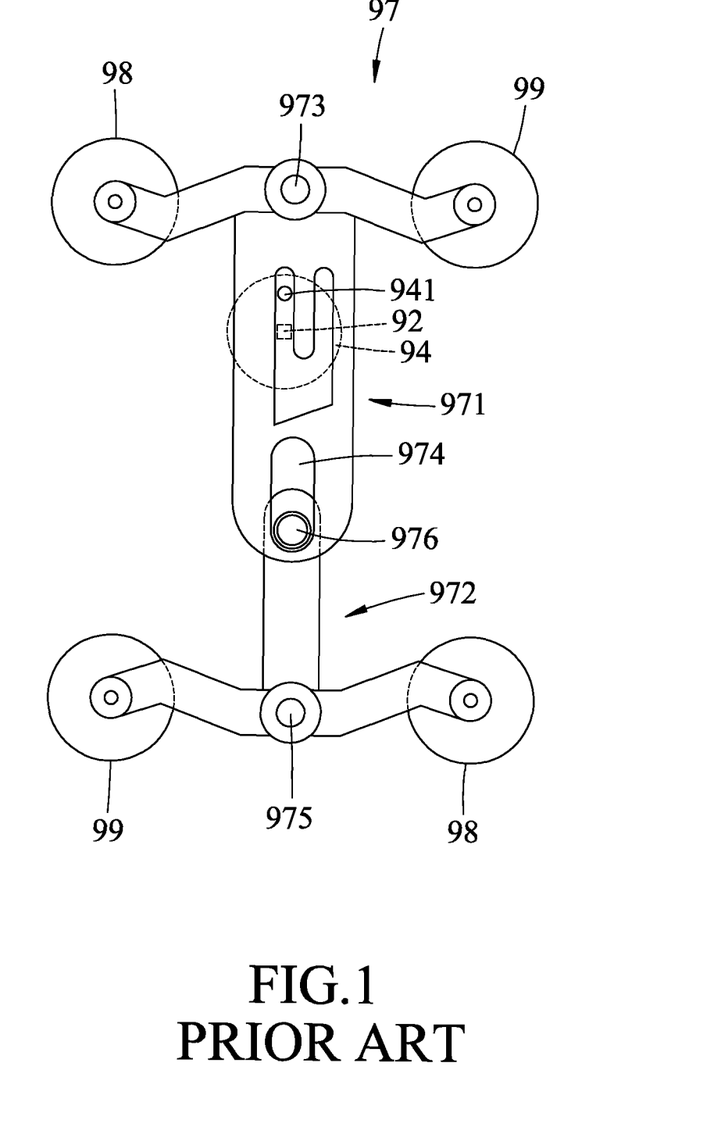
FIG. 1 is a schematic view of a frame body of a conventional wall climbing toy.
Figure 2:
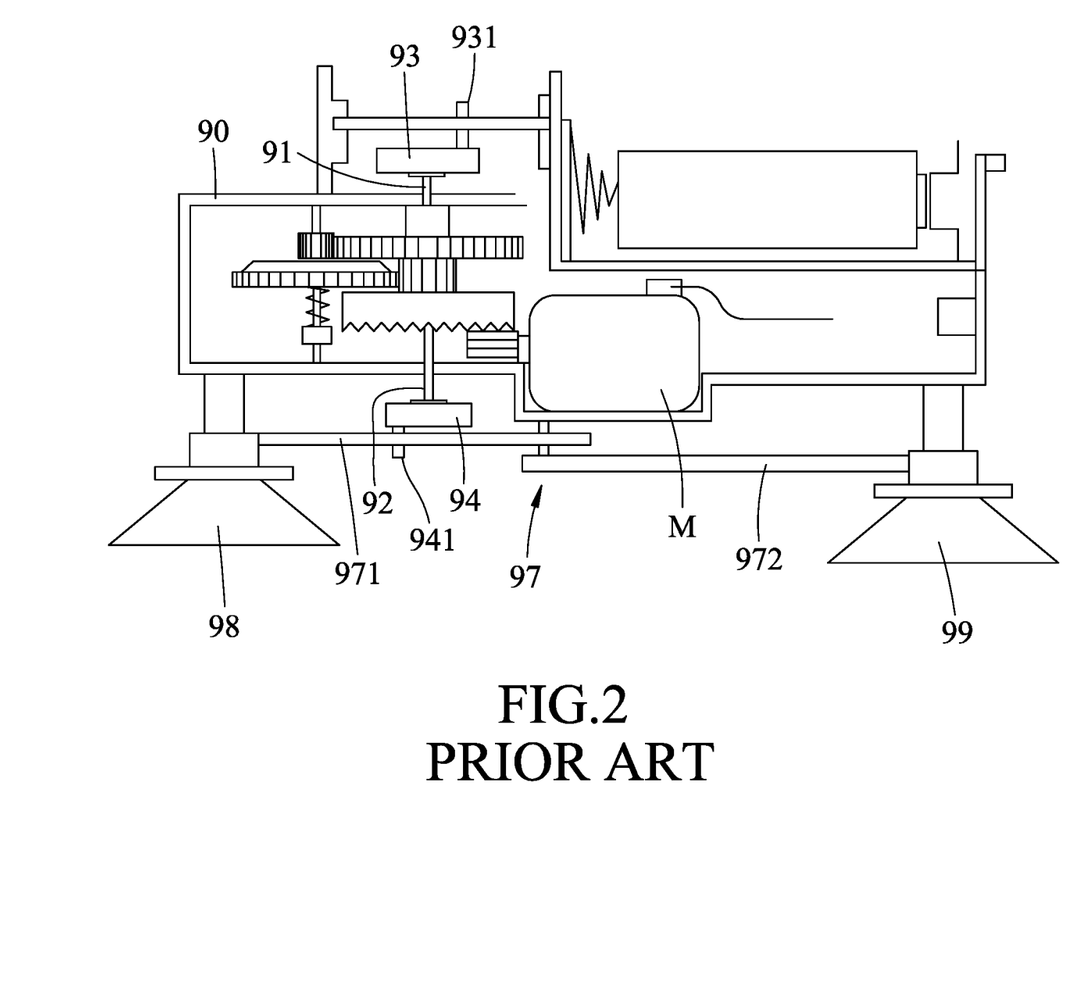
FIG. 2 is a side view of the conventional wall climbing toy.
Figure 3:
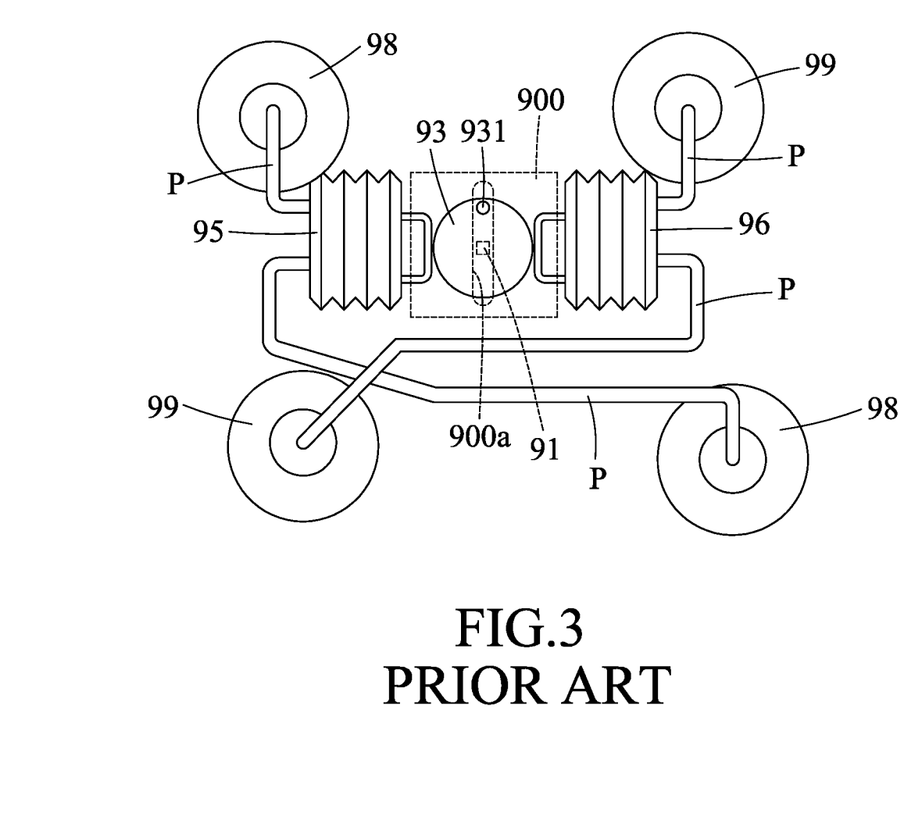
FIG. 3 is a schematic view illustrating connections among bellows pumps and suction cups of the conventional wall climbing toy.

Japanese patent application publication no. 2000-245975A discloses a conventional wall climbing toy. As shown in FIGS. 1 to 3, the conventional wall climbing toy includes a main body 90, a motor (M) mounted inside the main body 90, an upper shaft 91 coupled to be driven by the motor (M) to rotate, a lower shaft 92 coupled to be driven by the motor (M) to rotate, an upper crank member 93 coupled to the upper shaft 91 to rotate therewith, a lower crank member 94 coupled to the lower shaft 92 to rotate therewith, front and rear bellows pumps 95, 96, a frame body 97 mounted on a lower surface of the main body 90, four suction cups 98, 99 attached to the frame body 97, and four air tubes (P) each connecting an interior cavity of a corresponding one the suction cups 98, 99 to a corresponding one of the front and rear bellows pumps 95, 96.

The front and rear bellows pumps 95, 96 are mounted on a slider 900. The slider 900 is slidably mounted on the main body 900 and has a slot 900a. The upper crank member 93 has a connection pin 931 which is disposed radially offset from a rotation axis of the upper shaft 91 and which is slidably engaged in the slot 900a. Each of the front and rear bellows pumps 95, 96 is convertible between a collapsed state and an extension state. When the upper shaft 91 is rotated to permit the upper crank member 93 to rotate therewith, the front and rear bellows pumps 95, 96 are alternately converted from the extension state to the collapsed state. When the front bellows pump 95 is converted from the collapsed state to the extension state, the suction cups 98 can be deformed to form an air seal with a flat surface (not shown). When the front bellows pump 95 is converted from the extension state to the collapsed state, the air seal is broken to permit the suction cups 98 to leave the flat surface. Similarly, when the rear bellows pump 96 is converted from the collapsed state to the extension state, the suction cups 99 can be deformed to form an air seal with the flat surface. When the rear bellows pump 96 is converted from the extension state to the collapsed state, the air seal is broken to permit the suction cups 99 to leave the flat surface.

The frame body 97 includes a front segment 971 and a rear segment 972. The front segment 971 is pivotably mounted to the main body 90 by means of a front shaft 973, and has an elongated slot 974. The rear segment 972 is pivotably mounted to the main body 90 by means of a rear shaft 975 and has a protrusion 976 slidably engaged in the elongated slot 974.

The lower crank member 94 has a connection pin 941 which is disposed radially offset from a rotation axis of the lower shaft 92, and which is slidably coupled to the front segment 971. When the lower shaft 92 is driven to rotate, the front and rear segment 971, 972 are swung about the front and rear shafts 973, 975, respectively. When the front segment 971 is swung in a clockwise direction, the rear segment 972 is swung in a counterclockwise direction, and when the front segment 971 is swung in a counterclockwise direction, the rear segment 972 is swung in a clockwise direction. During operation, the upper shaft 91 and the lower shaft 92 are driven to rotate simultaneously, the front and rear segments 971, 972 are swung relative to each other, and the suction cups 98 and the suction cups 99 are alternately converted from the extension state to the collapsed state. Thus, the conventional wall climbing toy can move on a wall.

SUMMARY

Therefore, an object of the disclosure is to provide a novel wall climbing toy which simulates the movement of a four-limb animal.

According to a first aspect of the disclosure, a wall climbing toy includes a frame body, a left drive shaft, a primary post, a first spring-loaded release valve, a second spring-loaded release valve, a cam shaft, a drive unit, a left gear train, a first shaft extension, a pair of first primary crank arms, a pair of first connecting rods, a pair of first suction cups, and a pair of first air tube units. The frame body extends in a longitudinal direction and has a left side frame and a right side frame opposite to the left side frame in a direction transverse to the longitudinal direction. The left drive shaft is disposed rotatably on the left side frame. The primary post is disposed on the frame body and has a first inlet duct and a second inlet duct. The first and second spring-loaded release valves are located in the first and second inlet ducts of the primary post, respectively. Each of the first and second spring-loaded release valves is biased to a seal position and is displaceable to an open position. The cam shaft is disposed rotatably on the frame body and is configured such that when the cam shaft is rotated, the first and second spring-loaded release valves are alternately displaced from the seal position to the open position. The drive unit is disposed in the frame body and is configured to drive the left drive shaft and the cam shaft. The left gear train is disposed on the left side frame and is coupled to be driven by the left drive shaft. The left gear train has a first output shaft which is rotatably mounted on the left side frame and which has a first left end. The first shaft extension extends from the first output shaft and through the right side frame to terminate at a first right end. Each of the first primary crank arms has a crank region and a connecting region. The crank region is mounted on a corresponding one of the first left end and the first right end so as to permit each of the first primary crank arms to be rotated with the first output shaft. The connecting region is disposed radially offset from a first shaft axis of the first output shaft. Each of the first connecting rods has a lower segment and an upper segment which is opposite to the lower segment in an upright direction transverse to both of the longitudinal and transverse directions, and which is pivotally coupled to the connecting region of a corresponding one of the first primary crank arms. Each of the first suction cups has a non-deformable cap and a deformable cup body. The non-deformable cap defines an air hole, and is mounted to the lower segment of a corresponding one of the first connecting rods. The deformable cup body defines an interior cavity which is in fluid communication with the air hole such that when the deformable cup body is deformed to abut against a flat surface, a corresponding one of the first suction cups forms an air seal with the flat surface. Each of the first air tube units is configured to permit a corresponding one of the first and second inlet ducts of the primary post to be in fluid communication with the interior cavity of a corresponding one of the first suction cups such that when each of the first and second spring-loaded release valves is displaced to the open position, the air seal formed between the corresponding one of the first suction cups and the flat surface is broken, and such that when the left drive shaft is driven concurrently with the cam shaft to rotate, the air seals formed between the first suction cups and the flat surface are broken alternately so as to permit the first connecting rods to be alternately pulled away from the flat surface.

According to a second aspect of the disclosure, a wall climbing toy includes a frame body, a drive unit, a first drive shaft, a second drive shaft, a first module, a second module, a pair of first suction cups, a pump module, and a valve module. The drive unit is disposed in the frame body and includes a motor. The first and second drive shafts are disposed on the frame body and extend in different directions. The first and second drive shafts are coupled to be driven by the motor to rotate simultaneously. The first module is disposed on the frame body and is coupled to be driven by the first drive shaft to rotate. The second module is disposed on the frame body and is coupled to be driven by the first module to rotate. Each of the first suction cups has a deformable cup body defining an interior cavity, and a non-deformable cap interconnecting the deformable cup body and a corresponding one of the first and second modules. The deformable cup body is configured such that when the deformable cup body is deformed to abut against a flat surface, a corresponding one of the first suction cups forms an air seal with the flat surface. The pump module is disposed on the frame body and includes a pair of first air tube units that are in fluid communication with the interior cavities of the first suction cups, respectively. The valve module is disposed on the frame body and is coupled to be driven by the second drive shaft. The valve module is coupled to the first air tube units and is configured such that in response to rotation of the second drive shaft, the air seals formed between the first suction cups and the flat surface are broken alternately.

BRIEF DESCRIPTION OF THE DRAWINGS

Other features and advantages of the disclosure will become apparent in the following detailed description of the embodiment with reference to the accompanying drawings, in which.

DETAILED DESCRIPTION

Figure 5:
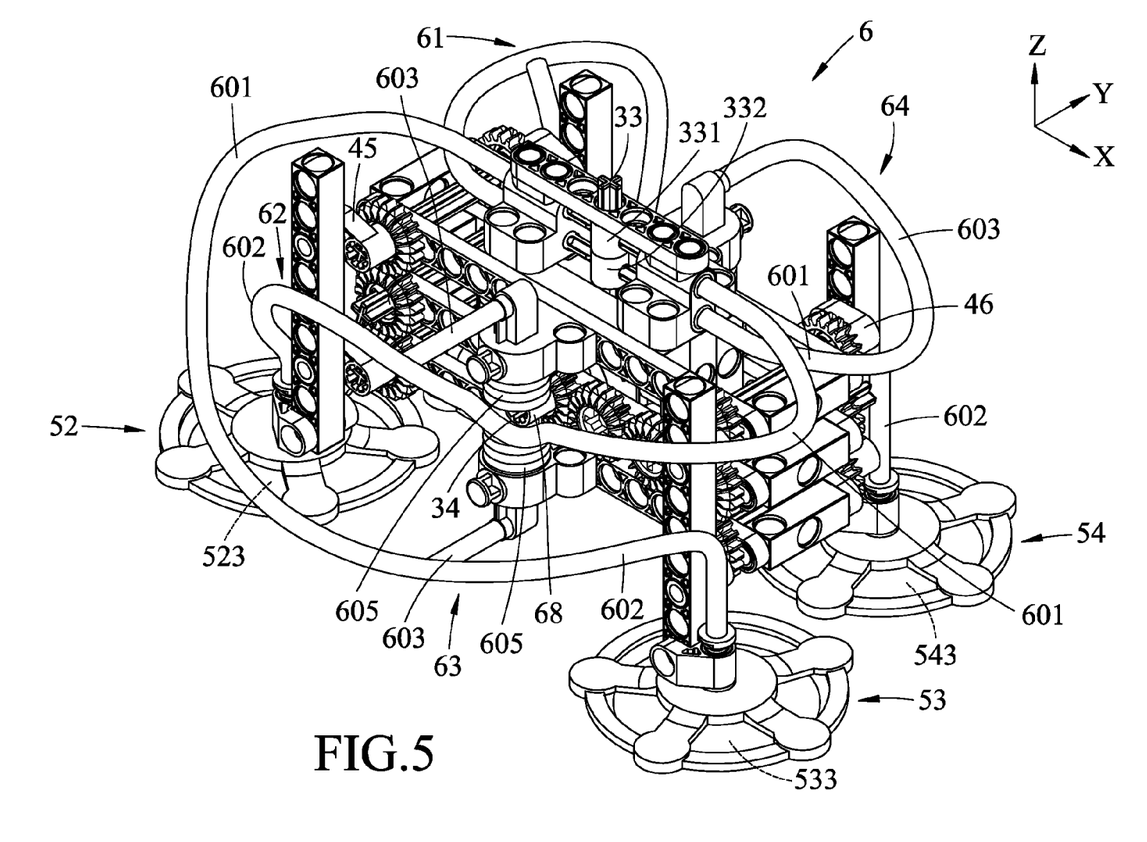
FIG. 5 is a right perspective view of the wall climbing toy according to the disclosure.
Figure 6:
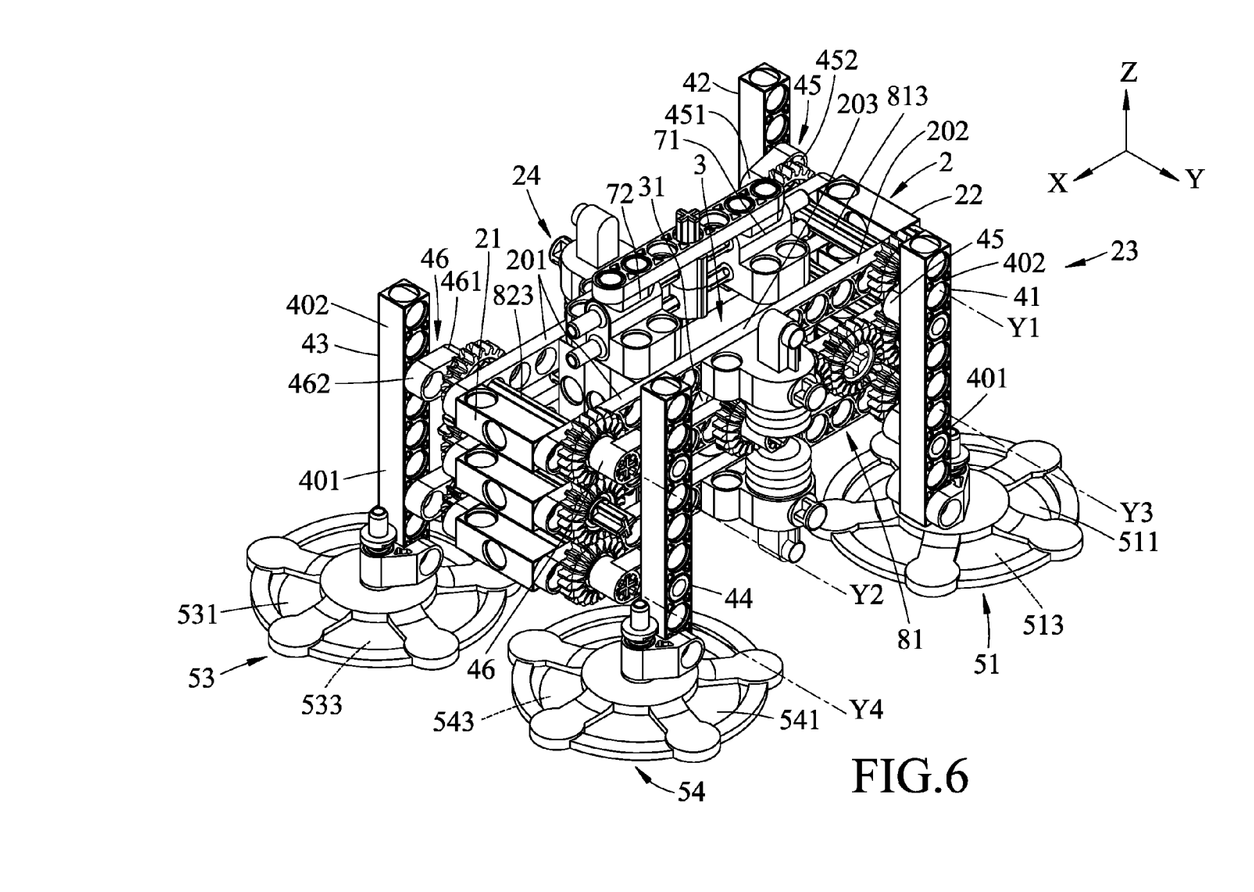
FIG. 6 is similar to FIG. 4 except that air tube units are omitted.
Figure 7:
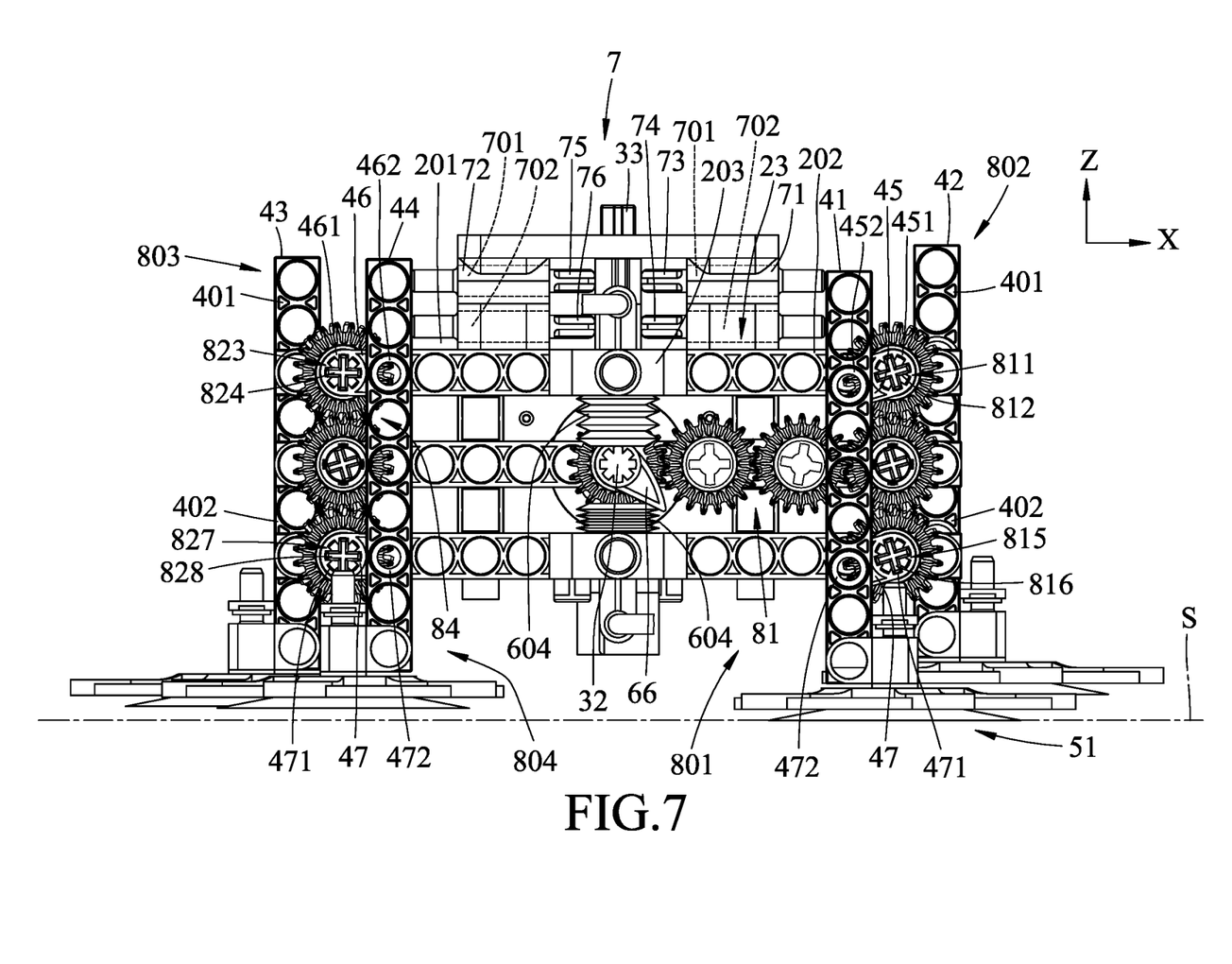
FIG. 7 is a left side view of the wall climbing toy shown in FIG. 6.
Figure 8:
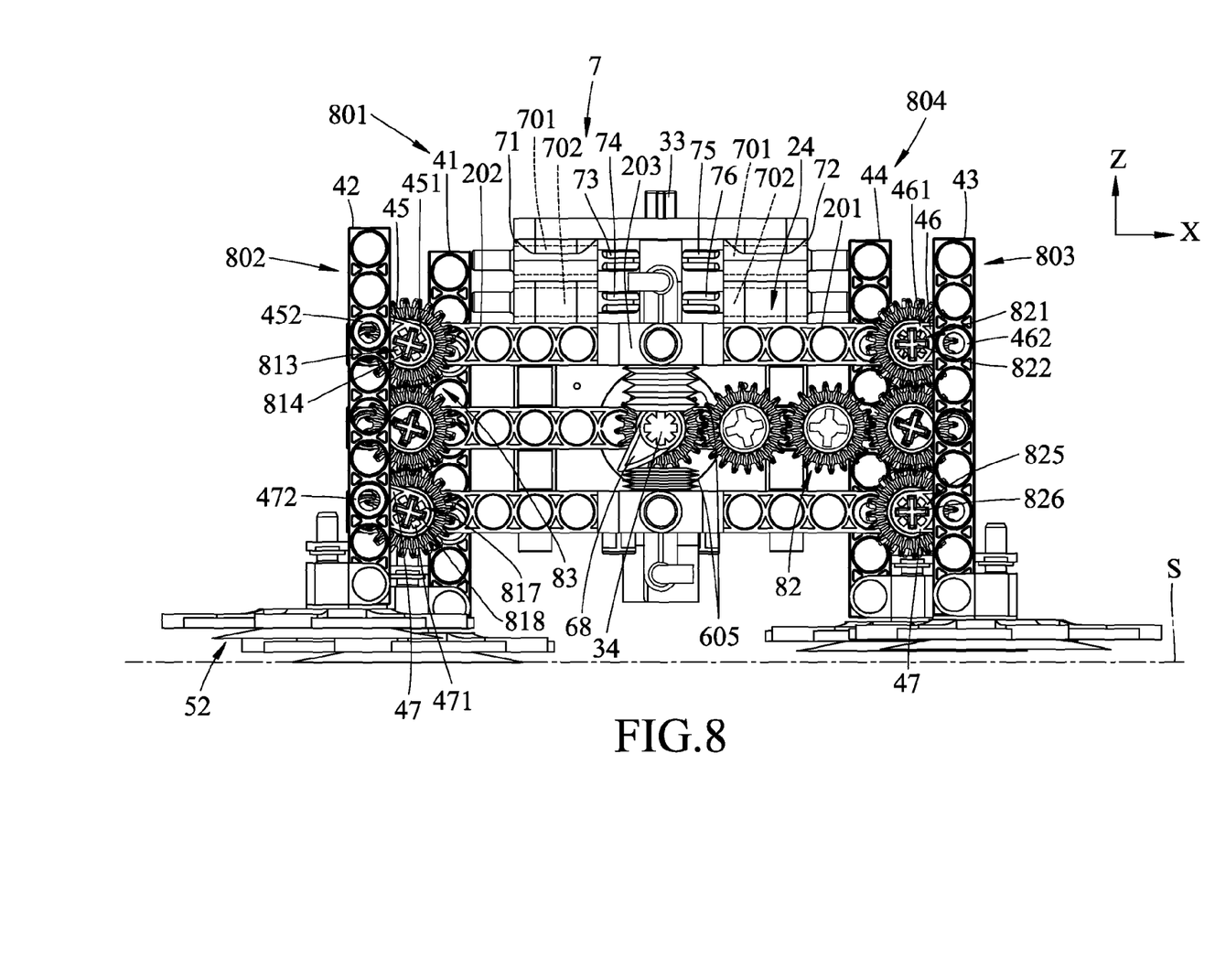
FIG. 8 is a right side view of the wall climbing toy shown in FIG. 6.

With reference to FIGS. 6 to 8, a wall climbing toy according to an embodiment of the disclosure is shown to include a frame body 2, a first drive shaft (i.e., a left drive shaft 32), a primary post 71, a first spring-loaded release valve 73, a second spring-loaded release valve 74, a second drive shaft (i.e., a cam shaft 33), a drive unit 3, a first gear train (i.e., a left gear train 81), a first shaft extension 813, a pair of first primary crank arms 45, a pair of first connecting rods 41, 42, a pair of first suction cups 51, 52 (see FIGS. 4 and 5), and a pump module 6. The pump module 6 includes a pair of first air tube units 61, 62 (see FIGS. 4 and 6).

As shown in FIG. 6, the frame body 2 has a front end 21, a rear end 22 opposite to the front end 21 in a longitudinal direction (X), a left side frame 23, and a right side frame 24 opposite to the left side frame in a transverse direction (Y) transverse to the longitudinal direction (X). Each of the left side frame 23 and the right side frame 24 has a forward region 201, a rearward region 202 opposite to the forward region 201 in the longitudinal direction (X), and amid region 203 disposed between the forward and rearward regions 201, 202.

As best shown in FIG. 7, the left drive shaft 32 is rotatably disposed on the left side frame 23. In this embodiment, the left drive shaft 32 is rotatably disposed on the mid region 203 of the left side frame 23.

The primary post 71 is disposed on the frame body 2, and has a first inlet duct 701 and a second inlet duct 702.

The first and second spring-loaded release valves 73, 74 are located in the first and second inlet ducts 701, 702 of the primary post 71, respectively. Each of the first and second spring-loaded release valves 73, 74 is biased to a seal position and is displaceable to an open position.

Figure 4:
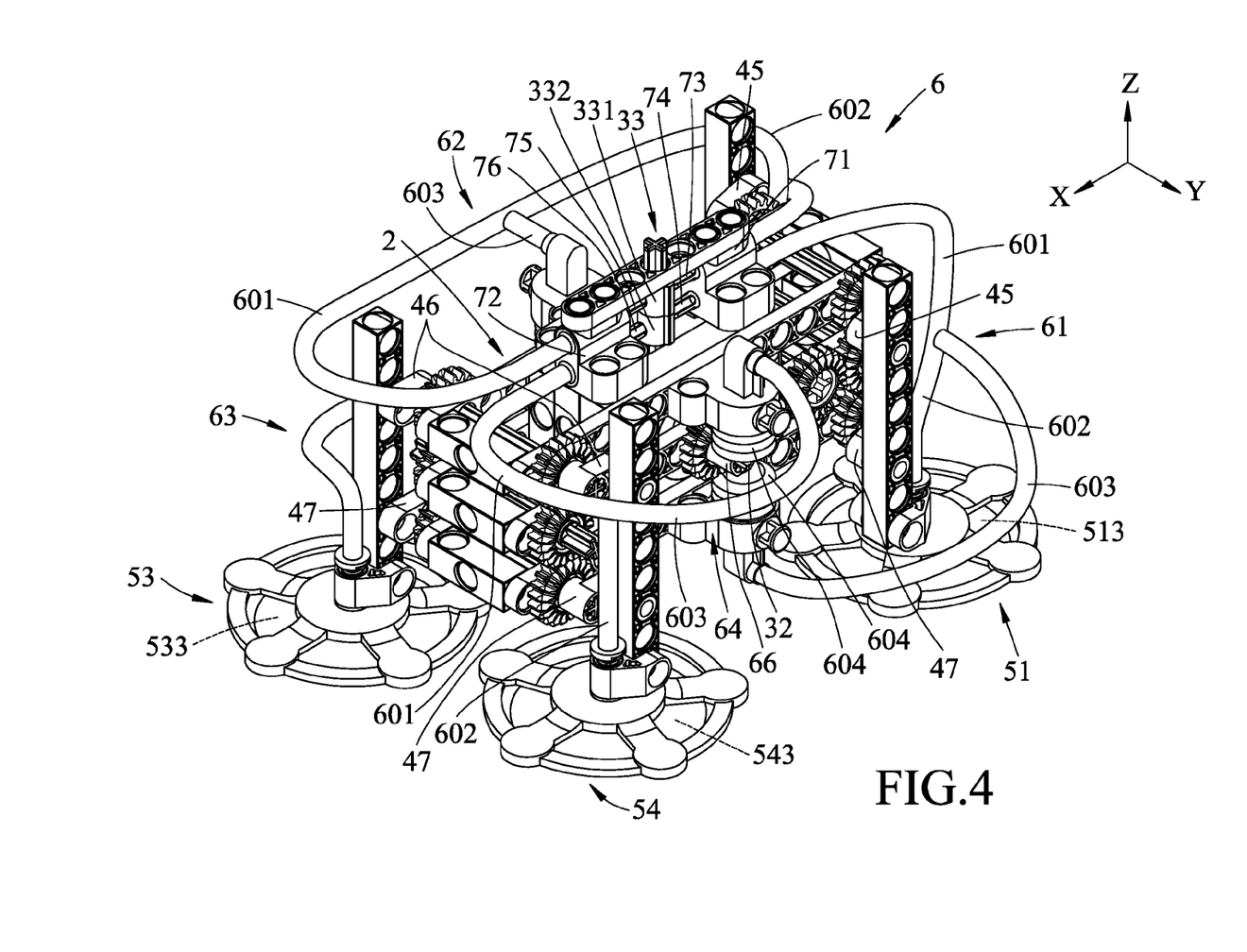
FIG. 4 is a left perspective view of a wall climbing toy according to an embodiment of the disclosure.

As shown in FIGS. 4 and 5, the camshaft 33 is rotatably disposed on the frame body 2 and is configured such that when the cam shaft 33 is rotated, the first and second spring-loaded release valves 73, 74 are alternately displaced from the seal position to the open position. In this embodiment, the cam shaft 33 extends in an upright direction (Z) transverse to both of the longitudinal and transverse directions (X, Y), and has an upper cam surface 331 and a lower cam surface 332. When the camshaft 33 is driven to rotate, the first and second spring-loaded release valves 73, 74 are alternately displaced from the seal position to the open position by the upper and lower cam surfaces 331, 332, respectively.

As shown in FIGS. 6 to 8, the drive unit 3 is disposed in the frame body 2 and is configured to drive the left drive shaft 32 and the camshaft 33. In this embodiment, the drive unit 3 has a motor 31 (see FIG. 6), and the left shaft 32 (see FIG. 7) and the cam shaft 33 are coupled to be driven by the motor 31.

With reference to FIG. 7, the left gear train 81 is disposed on the left side frame 23, and is coupled to be driven by the left drive shaft 32. The left gear train 81 has a first output shaft 811 which is rotatably mounted on the left side frame 23 and which has a first left end 812. The first output shaft 811 is rotatable about a first shaft axis (Y1) (see FIGS. 6 and 7). In this embodiment, the left gear train 81 is disposed on the rearward region 202 of the left side frame 23.

As shown in FIGS. 6 and 8, the first shaft extension 813 extends from the first output shaft 811 along the first shaft axis (Y1) and through the right side frame 24 to terminate at a first right end 814.

Each of the first primary crank arms 45 has a crank region 451 and a connecting region 452. The crank region 451 is mounted on a corresponding one of the first left end 812 and the first right end 814 (see FIGS. 7 and 8) so as to permit each of the first primary crank arms 45 to be rotated with the first output shaft 811. The connecting region 452 is disposed radially offset from the first shaft axis (Y1) of the first output shaft 811 (see FIGS. 6 to 8). In this embodiment, the connecting regions 452 of the first primary crank arms 45 are angularly displaced from each other by 180° relative to the first shaft axis (Y1).

Each of the first connecting rods 41, 42 has a lower segment 401 and an upper segment 402 opposite to the lower segment 401 in the upright direction (Z). The upper segment 402 is pivotally coupled to the connecting region 452 of a corresponding one of the first primary crank arms 45.

Figure 9:
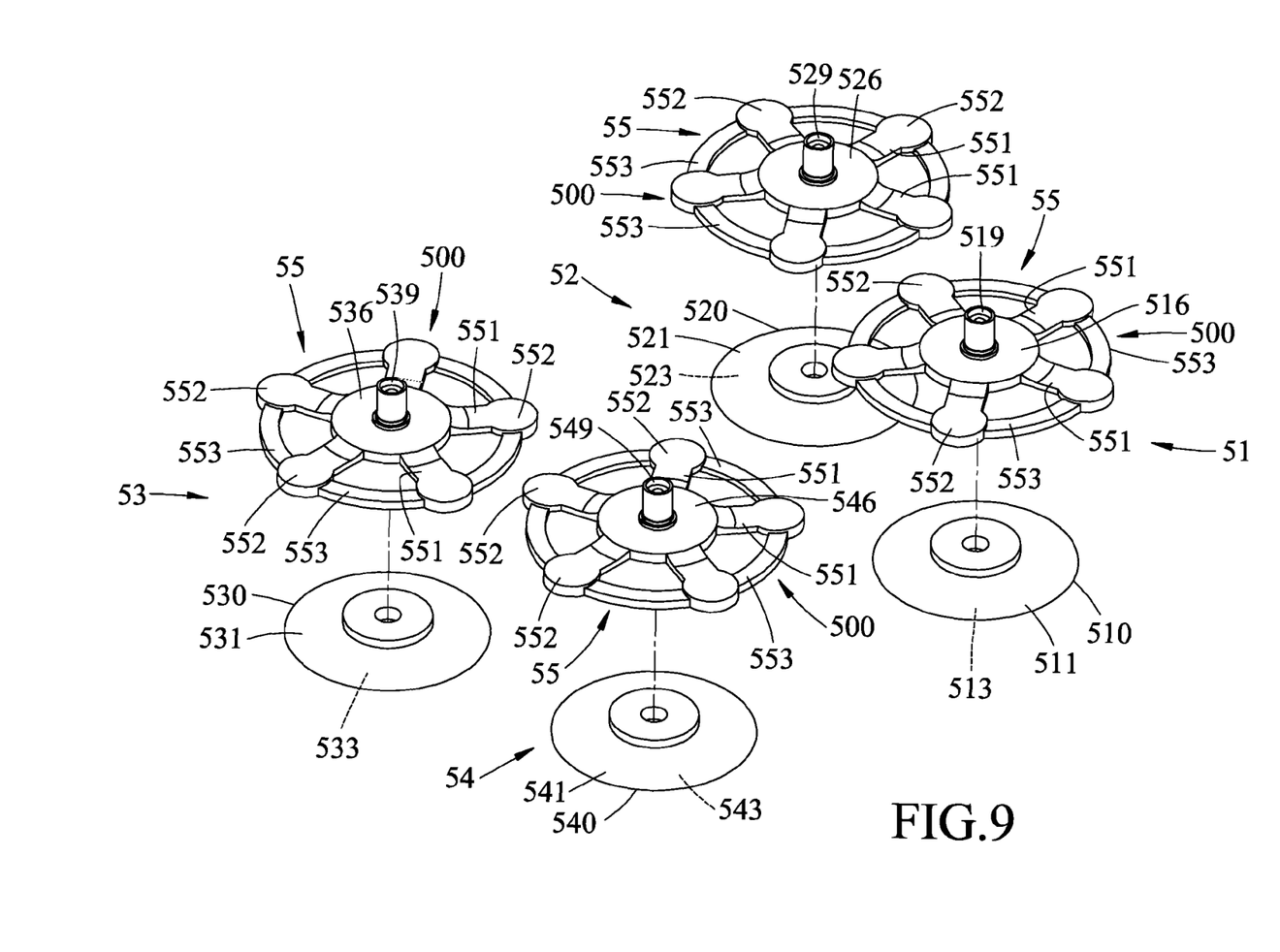
FIG. 9 is an exploded perspective view illustrating suction cups of the wall climbing toy.
Figure 10:
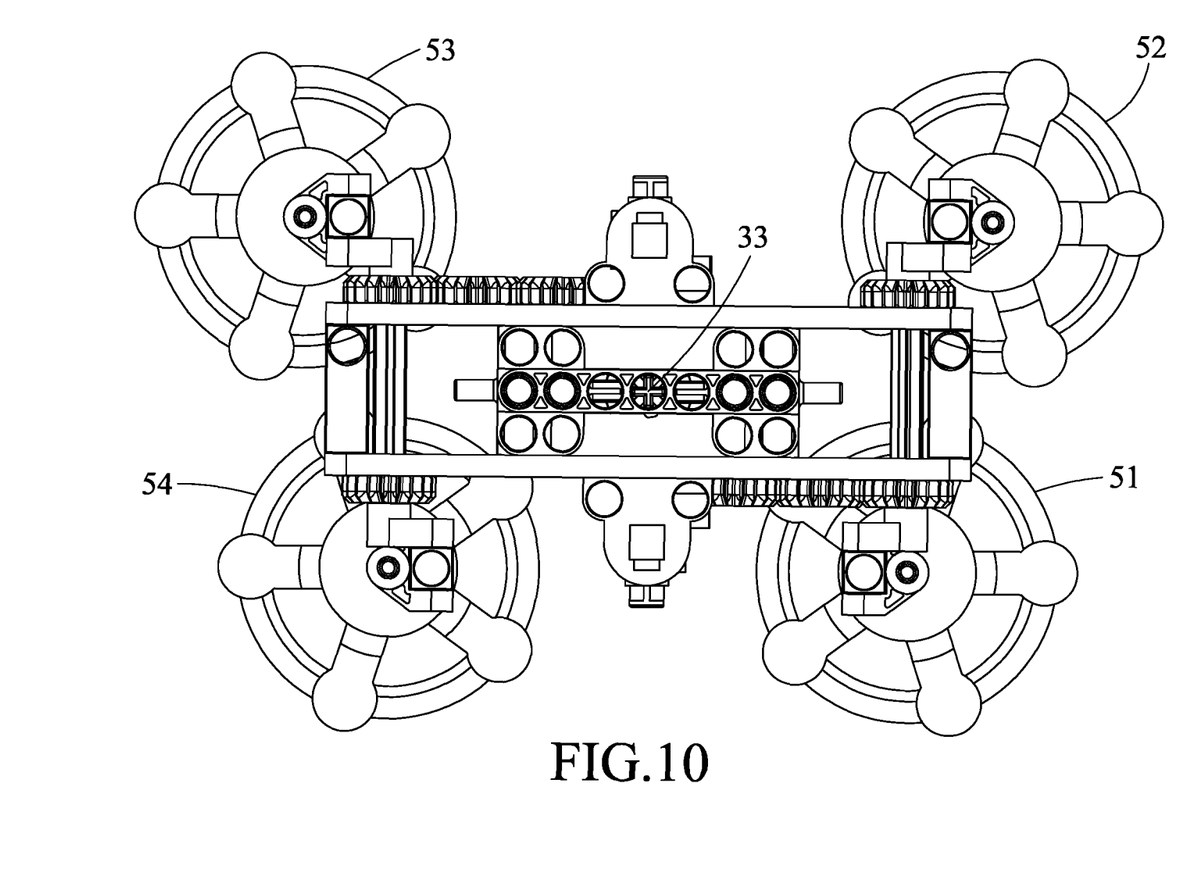
FIG. 10 is a top side view of the wall climbing toy shown in FIG. 6.

With reference to FIGS. 6, 9, and 10, the first suction cup 51 has a non-deformable cap 516 and a deformable cup body 511. The non-deformable cap 516 defines an air hole 519, and is mounted to the lower segment 401 of the first connecting rod 41. The deformable cup body 511 defines an interior cavity 513 which is in fluid communication with the air hole 519 of the first suction cup 51. Similarly, the first suction cup 52 has a non-deformable cap 526 and a deformable cup body 521. The non-deformable cap 526 defines an air hole 529, and is mounted to the lower segment 401 of the first connecting rod 42. The deformable cup body 521 defines an interior cavity 523 which is in fluid communication with the air hole 529 of the first suction cup 52. When the deformable cup body 511 or 521 is deformed to abut against a flat surface (S), a corresponding one of the first suction cups 51, 52 forms an air seal with the flat surface (S) (see FIGS. 7 and 8). The flat surface (S) may be a wall surface or a floor surface.

With reference to FIGS. 4, 5, 7, and 8, each of the first air tube units 61, 62 is configured to permit a corresponding one of the first and second inlet ducts 701, 702 of the primary post 71 to be in fluid communication with the interior cavity 513, 523 of a corresponding one of the first suction cups 51, 52 such that when each of the first and second spring-loaded release valves 73, 74 is displaced to the open position, the air seal formed between the corresponding one of the first suction cups 51, 52 and the flat surface (S) is broken, and such that when the left drive shaft 32 is driven concurrently with the cam shaft 33 to rotate, the air seals formed between the first suction cups 51, 52 and the flat surface (S) are broken alternately so as to permit the first connecting rods 41, 42 to be alternately pulled away from the flat surface (S).

As shown in FIGS. 4 to 8, the wall climbing toy further includes a third drive shaft (i.e., a right drive shaft 34), a secondary post 72, a third spring-loaded release valve 75, a fourth spring-loaded release valve 76, a second gear train (i.e., a right gear train 82), a second shaft extension 823, a pair of second primary crank arm 46, a pair of second connecting rods 43, 44, and a pair of second suction cups 53, 54. The pump module 6 further has a pair of second air tube units 63, 64.

As best shown in FIG. 8, the right drive shaft 34 is disposed rotatably on the mid region 203 of the right side frame 24, and is coupled to be driven by the motor 31 of the drive unit 3 (see FIG. 6).

With reference to FIGS. 6 to 8, the secondary post 72 is disposed on the frame body 2 and is spaced apart from the primary post 71 in the longitudinal direction (X). The secondary post 72 has a first inlet duct 701 and a second inlet duct 702. The cam shaft 33 is disposed between the primary and secondary posts 71, 72. The primary and secondary posts 71, 72 are proximate to the rear and front ends 22, 21, respectively. In this embodiment, the first and second inlet ducts 701, 702 of each of the primary and secondary posts 71, 72 are spaced apart from each other in the upright direction (Z).

The third and fourth spring-loaded release valves 75, 76 are located in the first and second inlet ducts 701, 702 of the secondary post 72, respectively. Each of the third and fourth spring-loaded release valves 75, 76 is biased to a seal position and is displaceable to an open position by a corresponding one of the upper and lower cam surfaces 331, 332 (see FIG. 4) such that when the cam shaft 33 is rotated, the third and fourth spring-loaded release valves 75, 76 are alternately displaced from the seal position to the open position.

As shown in FIG. 8, the right gear train 82 is disposed on the right side frame 24 and is coupled to be driven by the right drive shaft 34. The right gear train 82 has a second output shaft 821 which is rotatably mounted on the right side frame 24 and which has a second right end 822. The second output shaft 821 is rotatable about a second shaft axis (Y2) (see FIGS. 6 and 8). In this embodiment, the right gear train 82 is disposed on the forward region 201 of the right side frame 24.

As shown in FIGS. 6 to 8, the second shaft extension 823 extends from the second output shaft 821 along the second shaft axis (Y2) and through the left side frame 23 to terminate at a second left end 824.

Each of the second primary crank arms 46 has a crank region 461 and a connecting region 462. The crank region 461 is mounted on a corresponding one of the second right end 822 and the second left end 824 (see FIGS. 7 and 8), so as to permit each of the second primary crank arms 46 to be rotated with the second output shaft 821. The connecting region 462 is disposed radially offset from the second shaft axis (Y2) of the second output shaft 821. The second shaft axis (Y2) is parallel to and spaced apart from the first shaft axis (Y1). In this embodiment, the connecting regions 462 of the second primary crank arms 46 are angularly displaced from each other by 180° relative to the second shaft axis (Y2).

Each of the second connecting rods 43, 44 has a lower segment 401 and an upper segment 402 which is opposite to the lower segment 401 in the upright direction (Z), and which is pivotally coupled to the connecting region 462 of a corresponding one of the second primary crank arms 46. In this embodiment, the first connecting rods 41, 42 serve as a rear left leg (first leg) 41 and a rear right leg (second leg) 42 of the wall climbing toy, respectively, and the second connecting rods 43, 44 serve as a front right leg (third leg) 43 and a front left leg (fourth leg) 44 of the wall climbing toy, respectively.

As shown in FIG. 9, the second suction cup 53 has a non-deformable cap 536 and a deformable cup body 531. The non-deformable cap 536 defines an air hole 539, and is mounted to the lower segment 401 of the second connecting rods 43 (see FIG. 6). The deformable cup body 531 defines an interior cavity 533 which is in fluid communication with the air hole 539. The second suction cup 54 has a non-deformable cap 546 and a deformable cup body 541. The non-deformable cap 546 defines an air hole 549, and is mounted to the lower segment 401 of the second connecting rod 44. The deformable cup body 541 defines an interior cavity 543 which is in fluid communication with the air hole 549. When the deformable cup body 531 or 541 is deformed to abut against the flat surface (S), a corresponding one of the second suction cups 53, 54 forms an air seal with the flat surface (S). In this embodiment, the first suction cups 51, 52 are rear left and rear right suction cups 51, 52, respectively, and the second suction cups 53, 54 are front right and front left suction cups 53, 54, respectively.

Each of the second air tube units 63, 64 is configured to permit a corresponding one of the first and second inlet ducts 701, 702 of the secondary post 72 to be in fluid communication with the interior cavity 533, 543 of a corresponding one of the first suction cups 53, 54 such that when each of the third and fourth spring-loaded release valves 75, 76 is displaced to the open position, the air seal formed between the corresponding one of the first suction cups 53, 54 and the flat surface (S) is broken, and such that when the right drive shaft 34 is driven concurrently with the cam shaft 33 to rotate, the air seals formed between the second suction cups 53, 54 and the flat surface (S) are broken alternately so as to permit the second connecting rods 43, 44 to be alternately pulled away from the flat surface (S).

In addition, because the connecting regions 452 of the first primary crank arms 45 are angularly displaced from each other by 180° relative to the first shaft axis (Y1), when one of the first connecting rods 41, 42 is moved to be pulled away from the flat surface (S), the other one of the first connecting rods 41, 42 is moved to be placed on the flat surface (S). Similarly, because the connecting regions 462 of the second primary crank arms 46 are angularly displaced from each other by 180° relative to the second shaft axis (Y2), when one of the second connecting rods 43, 44 is moved to be pulled away from the flat surface (S), the other one of the second connecting rods 43, 44 is moved to be placed on the flat surface (S). Therefore, the wall climbing toy can closely simulate the movement of a four-limb animal.

With reference to FIGS. 4 and 5, in this embodiment, the first and second air tube units 61, 62, 63, 64 are grouped as a leftward pair of the air tube units 61, 64 and a rightward pair of the air tube units 62, 63.

The leftward pair of the air tube units 61, 64 (see FIGS. 4 and 5) are disposed to permit the second inlet ducts 702 of the primary and secondary posts 71, 72 (see FIGS. 7 and 8) to be respectively in fluid communication with the interior cavities 513, 543 of the rear left and front left suction cups 51, 54. The rightward pair of the air tube units 62, 63 (see FIGS. 4 and 5) are disposed to permit the first inlet ducts 701 of the primary and secondary posts 71, 72 (see FIGS. 7 and 8) to be respectively in fluid communication with the interior cavities 523, 533 of the rear right and front right suction cups 52, 53.

In this embodiment, the first and second output shafts 811, 821 are rotated in the same direction (e.g., a clockwise or counterclockwise direction) so as to permit all of the first and second primary crank arms 45, 46 to rotate in the same direction.

In this embodiment, each of the air tube units 61, 62, 63, 64 has a first air tube 601, a second air tube 602, and a third air tube 603. The first air tube 601 is connected to a corresponding one of the first and second inlet ducts 701 of the primary and secondary posts 71, 72. The second air tube 602 is connected to the interior cavity 513, 523, 533, or 543 of a corresponding one of the first and second suction cups 51, 52, 53, 54. The third air tube 603 is connected to be in fluid communication with both the first and second air tubes 601, 602.

The pump module 6 further includes a pair of left bellows pumps 604, a left cam member 66, a pair of right bellows pumps 605, and a right cam member 68.

Each of the left bellows pumps 604 is connected to the third air tube 603 of a corresponding one of the leftward pair of the air tube units 61, 64 so as to be in fluid communication with the first and second air tubes 601, 602 of the corresponding one of the leftward pair of the air tube units 61, 64.

The left cam member 66 is coupled to the left drive shaft 32 so as to rotate therewith, and is interposed between the left bellows pumps 604. The left cam member 66 is configured to alternately actuate the left bellows pumps 604 when the left cam member 66 is driven by the left drive shaft 32 to rotate, thereby permitting a drawing force and a blowing force of each of the left bellows pumps 604 to be alternately applied to a corresponding one of the interior cavities 513, 543 of the rear left and front left suction cups 51, 54.

Each of the right bellows pumps 605 is connected to the third air tube 603 of a corresponding one of the rightward pair of the air tube units 62, 63 so as to be in fluid communication with the first and second air tubes 601, 602 of the corresponding one of the rightward pair of the air tube units 62, 63.

The right cam member 68 is coupled to the right drive shaft 34 so as to rotate therewith, and is interposed between the right bellows pumps 605. The right cam member 68 is configured to alternately actuate the right bellows pumps 605 when the right cam member 68 is driven by the right drive shaft 34 to rotate, thereby permitting a drawing force and a blowing force of each of the right bellows pumps 605 to be alternately applied to a corresponding one of the interior cavities 523, 533 of the rear right and front right suction cups 52, 53.

In this embodiment, the wall climbing toy further includes four edge pressing members 55 (see FIG. 9) each of which includes a plurality of radial ribs 551 extending from the non-deformable cap 516, 526, 536, 546 of a corresponding one of the first and second suction cups 51, 52, 53, 54 to terminate at a plurality of contact ends 552 that are to be brought to abut against the flat surface (S) and a marginal edge 510, 520, 530, 540 of the deformable cup body 511, 521, 531, 541 of the corresponding one of the first and second suction cups 51, 52, 53, 54 so as to ensure the air seal between the flat surface (S) and the corresponding one of the first and second suction cups 51, 52, 53, 54 along the marginal edge 510, 520, 530, 540.

In this embodiment, each of the edge pressing members further includes a plurality of curved ribs 553 interconnecting the contact ends 552.

As shown in FIGS. 6 and 7, the left gear train 81 further has a third output shaft 815 which is mounted rotatably on the rearward region 202 of the left side frame 23 and which has a third left end 816. The third output shaft 815 is rotatable about a third shaft axis (Y3) which is parallel to and spaced apart from the first shaft axis (Y1).

As shown in FIGS. 6 and 8, the right gear train 82 further has a fourth output shaft 825 which is mounted rotatably on the right side frame 24 and which has a fourth right end 826. The fourth output shaft 825 is rotatable about a fourth shaft axis (Y4) which is parallel to and spaced apart from the second shaft axis (Y2).

In this embodiment, the wall climbing toy further includes a third shaft extension 817, a fourth shaft extension 827, and four auxiliary crank arms 47.

The third shaft extension 817 extends from the third output shaft 815 along the third shaft axis (Y3) and through the right side frame 24 to terminate at a third right end 818.

The fourth shaft extension 827 extends from the fourth output shaft 825 along the fourth shaft axis (Y4) and through the left side frame 23 to terminate at a fourth left end 828.

Each of the auxiliary crank arms 47 has a crank region 471 and a connecting region 472. The crank region 471 is mounted on a corresponding one of the third left end 816, the third right end 818, the fourth left end 828, and the fourth right end 826, so as to permit each of the auxiliary crank arms 47 to be rotated with a corresponding one of the third and fourth output shafts 815, 825. The connecting region 472 is disposed radially offset from a corresponding one of the third and fourth shaft axes (Y3, Y4), and is pivotally coupled to the lower segment 402 of a corresponding one of the first and second connecting rods 41, 42, 43, 44.

As shown in FIGS. 7 and 8, the wall climbing toy further includes a third gear unit (i.e., a right gear unit 83) and a fourth gear unit (i.e., a left gear unit 84).

The right gear unit 83 is disposed on the rearward region 202 of the right side frame 24, and is coupled to both of the first and third shaft extensions 813, 817 so as to permit the first and third shaft extensions 813, 817 to rotate in the same direction.

The left gear unit 84 is disposed on the frontward region 201 of the left side frame 23, and is coupled to both of the second and fourth shaft extensions 823, 827 so as to permit the second and fourth shaft extensions 823, 827 to rotate in the same direction.

In other aspect of the disclosure, a first module 801 is coupled to be driven by the first drive shaft 32, and includes the first gear train 81, the first leg 41, the first output shaft extension 813, the third output shaft extension 817, and the crank arms 45, 47 each coupling the first leg 41 to a corresponding one of the first and third output shafts 811, 815 of the first gear train 81. A second module 802 is coupled to be driven by the first module 801, and includes the second gear train 82, the second leg 42, and the crank arms 45, 47 each coupling the second leg 42 to a corresponding one of the first and third output shaft extensions 813, 817. A third module 803 is coupled to be driven by the third drive shaft 34, and includes the third gear train 83, the second output shaft extension, 823, the fourth output shaft extension 827, the third leg 43, and the crank arms 46, 47 each coupling the third leg 43 to a corresponding one of the second and fourth output shafts 821, 825 of the third gear train 83. A fourth module 804 is coupled to be driven by the third module 803, and includes the fourth gear train 84, the fourth leg 44, and the crank arms 46, 47 each coupling the fourth leg 44 to a corresponding one of the second and fourth output shaft extensions 823, 827. A valve module 7 is disposed on the frame body 2 and is coupled to be driven by the second drive shaft 33. The valve module 7 includes the primary post 71, the secondary post 72, and the first, second, third, and fourth spring-loaded release valve 73, 74, 75, 76. In response to rotation of the second drive shaft 33, the air seals formed between the first suction cups 51, 52 and the flat surface (S) are broken alternately, and the air seals formed between the second suction cups 53, 54, and the flat surface (S) are broken alternately. The non-deformable cap 516, 526, 536, or 546 and the edge pressing member 55 for each of the first and second suction cups 51, 52, 53, 54 can be integrally formed into a non-deformable body 500.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A wall climbing toy comprising:
   a frame body extending in a longitudinal direction and having a left side frame and a right side frame opposite to said left side frame in a direction transverse to the longitudinal direction;
   a left drive shaft disposed rotatably on said left side frame;
   a primary post disposed on said frame body and having a first inlet duct and a second inlet duct;
   a first spring-loaded release valve and a second spring-loaded release valve which are located in said first and second inlet ducts of said primary post, respectively, each of said first and second spring-loaded release valves being biased to a seal position and being displaceable to an open position;
   a cam shaft disposed rotatably on said frame body and configured such that when said cam shaft is rotated, said first and second spring-loaded release valves are alternately displaced from the seal position to the open position;
   a drive unit disposed in said frame body and configured to drive said left drive shaft and said cam shaft;
   a left gear train disposed on said left side frame and coupled to be driven by said left drive shaft, said left gear train having a first output shaft which is rotatably mounted on said left side frame and which has a first left end;
   a first shaft extension extending from said first output shaft and through said right side frame to terminate at a first right end;
   a pair of first primary crank arms each having
      a crank region mounted on a corresponding one of said first left end and said first right end so as to permit each of said first primary crank arms to be rotated with said first output shaft, and
      a connecting region disposed radially offset from a first shaft axis of said first output shaft;
   a pair of first connecting rods each having a lower segment and an upper segment which is opposite to said lower segment in an upright direction transverse to both of the longitudinal and transverse directions, and which is pivotally coupled to said connecting region of a corresponding one of said first primary crank arms;
   a pair of first suction cups each having
      a non-deformable cap defining an air hole, and mounted to said lower segment of a corresponding one of said first connecting rods, and a deformable cup body defining an interior cavity which is in fluid communication with said air hole such that when the deformable cup body is deformed to abut against a flat surface, a corresponding one of said first suction cups forms an air seal with the flat surface; and a pair of first air tube units each configured to permit a corresponding one of said first and second inlet ducts of said primary post to be in fluid communication with said interior cavity of a corresponding one of said first suction cups such that when each of said first and second spring-loaded release valves is displaced to the open position, the air seal formed between the corresponding one of said first suction cups and the flat surface is broken, and such that when said left drive shaft is driven concurrently with said cam shaft to rotate, the air seals formed between said first suction cups and the flat surface are broken alternately so as to permit said first connecting rods to be alternately pulled away from the flat surface.

2. The wall climbing toy according to claim 1, wherein:

said frame body has a front end and a rear end opposite to said front end in the longitudinal direction;

each of said left side frame and said right side frame has a forward region, a rearward region opposite to said forward region in the longitudinal direction, and a mid region disposed between said forward and rearward regions, said left drive shaft being disposed rotatably on said mid region of said left side frame; and said cam shaft has an upper cam surface and a lower cam surface which are configured such that when said cam shaft is driven to rotate, said first and second spring-loaded release valves are displaced from the seal position to the open position by said upper and lower cam surfaces, respectively, said wall climbing toy further comprising:

a right drive shaft which is disposed rotatably on said mid region of said right side frame, and which is coupled to be driven by said drive unit;

a secondary post which is disposed on said frame body and which is spaced apart from said primary post in the longitudinal direction, said secondary post having a first inlet duct and a second inlet duct, said cam shaft being disposed between said primary and secondary posts, said primary and secondary posts being proximate to said rear and front ends, respectively;

a third spring-loaded release valve and a fourth spring-loaded release valve which are located in said first and second inlet ducts of said secondary post, respectively, each of said third and fourth spring-loaded release valves being biased to a seal position and being displaceable to an open position by a corresponding one of said upper and lower cam surfaces such that when said cam shaft is rotated, said third and fourth spring-loaded release valves are alternately displaced from the seal position to the open position;

a right gear train disposed on said right side frame and coupled to be driven by said right drive shaft, said right gear train having a second output shaft which is rotatably mounted on said right side frame and which has a second right end;

a second shaft extension extending from said second output shaft and through said left side frame to terminate at a second left end;

a pair of second primary crank arms each having
a crank region mounted on a corresponding one of said second right end and second left end, so as to permit each of said second primary crank arms to be rotated with said second output shaft, and
a connecting region disposed radially offset from a second shaft axis of said second output shaft;

a pair of second connecting rods each having a lower segment and an upper segment which is opposite to said lower segment in the upright direction, and which is pivotally coupled to said connecting region of a corresponding one of said second primary crank arms;

a pair of second suction cups each having
a non-deformable cap defining an air hole, and mounted to said lower segment of a corresponding one of said second connecting rods, and
a deformable cup body defining an interior cavity which is in fluid communication with said air hole such that when said deformable cup body is deformed to abut against the flat surface, a corresponding one of said second suction cups forms an air seal with the flat surface; and a pair of second air tube units each configured to permit a corresponding one of said first and second inlet ducts of said secondary post to be in fluid communication with said interior cavity of a corresponding one of said first suction cups such that when each of said third and fourth spring-loaded release valves is displaced to the open position, the air seal formed between the corresponding one of said first suction cups and the flat surface is broken, and such that when said right drive shaft is driven concurrently with said cam shaft to rotate, the air seals formed between said second suction cups and the flat surface are broken alternately so as to permit said second connecting rods to be alternately pulled away from the flat surface.

3. The wall climbing toy according to claim 2, wherein:

said first connecting rods serve as a rear left leg and a rear right leg of said wall climbing toy, respectively, and said second connecting rods serve as a front right leg and a front left leg of said wall climbing toy, respectively; said left gear train is disposed on said rearward region of said left side frame and said right gear train is disposed on said forward region of said right side frame;

said first suction cups are rear left and rear right suction cups, respectively, and said second suction cups are front right and front left suction cups, respectively;

said first and second inlet ducts of each of said primary and secondary posts are spaced apart from each other in the upright direction; and said first and second air tube units are grouped as
a leftward pair of said air tube units disposed to permit said first inlet ducts or said second inlet ducts of said primary and secondary posts to be respectively in fluid communication with said interior cavities of said rear left and front left suction cups, and
a rightward pair of said air tube units disposed to permit said second inlet ducts or said first inlet ducts of said primary and secondary posts to be respectively in fluid communication with said interior cavities of said rear right and front right suction cups.

4. The wall climbing toy according to claim 3, wherein each of said air tube units includes a first air tube and a second air tube, said wall climbing toy further comprising:

a pair of left bellows pumps each disposed to be in fluid communication with said first and second air tubes of a corresponding one of said leftward pair of said air tube units;

a left cam member which is coupled to said left drive shaft so as to rotate therewith, and which is interposed between said left bellows pumps, said left cam member being configured to alternately actuate said left bellows pumps when said left cam member is driven to rotate, thereby permitting a drawing force and a blowing force of each of said left bellows pumps to be alternately applied to a corresponding one of said interior cavities of said rear left and front left suction cups;

a pair of right bellows pumps each disposed to be in fluid communication with said first and second air tubes of a corresponding one of said rightward pair of said air tube units; and a right cam member which is coupled to said right drive shaft so as to rotate therewith, and which is interposed between said right bellows pumps, said right cam member being configured to alternately actuate said right bellows pumps when said right cam member is driven to rotate, thereby permitting a drawing force and a blowing force of each of said right bellows pumps to be alternately applied to a corresponding one of said interior cavities of said rear right and front right suction cups.

5. The wall climbing toy according to claim 2, further comprising four edge pressing members each of which includes a plurality of radial ribs extending from said non-deformable cap of a corresponding one of said first and second suction cups to terminate at a plurality of contact ends that are to be brought to abut against a marginal edge of said deformable cup body of the corresponding one of said first and second suction cups so as to ensure the air seal formed between the corresponding one of said first and second suction cups and the flat surface along said marginal edge.

6. The wall climbing toy according to claim 5, wherein each of said edge pressing members further includes a plurality of curved ribs interconnecting said contact ends.

7. The wall climbing toy according to claim 2, wherein the first shaft axis of said first output shaft is parallel to and spaced apart from the second shaft axis of said second output shaft.

8. The wall climbing toy according to claim 7, wherein:
said left gear train further has a third output shaft which is mounted rotatably on said left side frame and which has a third left end, said third output shaft being rotatable about a third shaft axis which is parallel to and spaced apart from the first shaft axis; and
said right gear train further has a fourth output shaft which is mounted rotatably on said right side frame and which has a fourth right end, said fourth output shaft being rotatable about a fourth shaft axis which is parallel to and spaced apart from said second shaft axis, said wall climbing toy further comprising:
a third shaft extension extending from said third output shaft and through said right side frame to terminate at a third right end;
a fourth shaft extension extending from said fourth output shaft and through said left side frame to terminate at a fourth left end; and
four auxiliary crank arms each having
a crank region mounted on a corresponding one of said third left end, said third right end, said fourth left end, and said fourth right end, so as to permit each of said auxiliary crank arms to be rotated with a corresponding one of said third and fourth output shafts, and a connecting region which is disposed radially offset from a corresponding one of the third and fourth shaft axes, and which is pivotally coupled to said lower segment of a corresponding one of said first and second connecting rods.

9. The wall climbing toy according to claim 8, further comprising:
a right gear unit which is disposed on said right side frame, and which is coupled to both of said first and third shaft extensions so as to permit said first and third shaft extensions to rotate in the same direction; and
a left gear unit which is disposed on said left side frame, and which is coupled to both of said second and fourth shaft extensions so as to permit said second and fourth shaft extensions to rotate in the same direction.

10. A wall climbing toy comprising:
a frame body;
a drive unit disposed in said frame body and including a motor;
a first drive shaft and a second drive shaft which are disposed on said frame body and which extend in different directions, said first and second drive shafts being coupled to be driven by said motor to rotate simultaneously;
a first module disposed on said frame body and coupled to be driven by said first drive shaft to rotate;
a second module disposed on said frame body and coupled to be driven by said first module to rotate;
a pair of first suction cups each having
a deformable cup body defining an interior cavity, and
a non-deformable body interconnecting said deformable cup body and a corresponding one of said first and second modules, said deformable cup body being configured such that when said deformable cup body is deformed to abut against a flat surface, a corresponding one of said first suction cups forms an air seal with the flat surface, and said non-deformable body of the corresponding one of said first suction cups abuts against the flat surface;
a pump module which is disposed on said frame body and which includes a pair of first air tube units that are in fluid communication with said interior cavities of said first suction cups, respectively; and
a valve module disposed on said frame body and coupled to be driven by said second drive shaft, said valve module being coupled to said first air tube units and being configured such that in response to rotation of said second drive shaft, the air seals formed between said first suction cups and the flat surface are broken alternately.

11. The wall climbing toy according to claim 10, wherein said non-deformable body has a non-deformable cap and an edge pressing member, said non-deformable cap interconnecting said deformable cup body and the corresponding one of said first and second modules, said edge pressing member having a plurality of radial ribs extending from said non-deformable cap to terminate at a plurality of contact ends that are to be brought to abut against the flat surface and a marginal edge of said deformable cup body of the corresponding one of said first suction cups.

12. The wall climbing toy according to claim 10, further comprising:
a third drive shaft disposed on said frame body and extending opposite to said first drive shaft, said third drive shaft being coupled to be driven by said motor to rotate simultaneously with said first and second drive shafts;

a third module disposed on said frame body and coupled to be driven by said third drive shaft to rotate;
a fourth module disposed on said frame body and coupled to be driven by said third module to rotate; and
a pair of second suction cups each having
a deformable cup body defining an interior cavity, and
a non-deformable cap interconnecting said deformable cup body and a corresponding one of said third and fourth modules, said deformable cup body of each of said second suction cups being configured such that when said deformable cup body of each of said second suction cups is deformed to abut against the flat surface, a corresponding one of said second suction cups forms an air seal with the flat surface, wherein:
said pump module further includes a pair of second air tube units that are in fluid communication with said interior cavities of said second suction cups, respectively; and
said valve module being further coupled to said second air tube units such that in response to the rotation of said second drive shaft, the air seals formed between said second suction cups and the flat surface are broken alternately.

13. The wall climbing toy according to claim 12, wherein:
said first module includes
a first gear train which is coupled to be driven by said first drive shaft, and which has a first output shaft and a third output shaft that are rotatably mounted on said frame body,
a first output shaft extension which extends from said first output shaft,
a third output shaft extension which extends from said third output shaft,
a first leg which is coupled to one of said first suction cups, and
two crank arms each coupling said first leg to a corresponding one of said first and third output shafts;
said second module includes
a second gear train which is coupled to be driven by said first and third shaft extensions,
a second leg which is coupled to the other one of said first suction cups, and
two crank arms each coupling said second leg to a corresponding one of said first and third output shaft extensions;
said third module includes
a third gear train which is coupled to be driven by said third drive shaft, and which has a second output shaft and a fourth output shaft that are rotatably mounted on said frame body,
a second output shaft extension which extends from said second output shaft,
a fourth output shaft extension which extends from said fourth output shaft,
a third leg which is coupled to one of said second suction cups, and
two crank arms each coupling said third leg to a corresponding one of said second and fourth output shafts; and
said fourth module includes
a fourth gear train which is coupled to be driven by said second and fourth shaft extensions,
a fourth leg which is coupled to the other one of said second suction cups, and
two crank arms each coupling said fourth leg to a corresponding one of said second and fourth output shaft extensions.

14. A suction cup for a wall climbing toy comprising:
a non-deformable body; and
a deformable cup body which is connected to said non-deformable body, and which is configured such that when said deformable cup body is deformed to abut against a flat surface, an air seal is formed between said deformable cup body and the flat surface, and said non-deformable body is brought to abut against the flat surface,
wherein said deformable cup body defines an interior cavity, and said non-deformable body has a non-deformable cap and an edge pressing member, said non-deformable cap defining an air hole in fluid communication with said interior cavity, said edge pressing member including a plurality of radial ribs extending from said non-deformable cap to terminate at a plurality of contact ends that are to be brought to abut against the flat surface and a marginal edge of said deformable cup body.

15. The suction cup according to claim 14, wherein said edge pressing members further includes a plurality of curved ribs interconnecting said contact ends.

* * * * *